(12) United States Patent
Oh et al.

(10) Patent No.: US 9,825,294 B2
(45) Date of Patent: Nov. 21, 2017

(54) POSITIVE ELECTRODE ACTIVE MATERIAL FOR LITHIUM SECONDARY BATTERY AND METHOD FOR PREPARING THE SAME

(75) Inventors: Sung Woo Oh, Daejeon (KR); Hee Young Sun, Yongin-si (KR); Yu Rim Do, Seoul (KR); Hyung Bok Lee, Seoul (KR)

(73) Assignee: SK Innovation Co., Ltd., Seoul (KR)

( * ) Notice: Subject to any disclaimer, the term of this patent is extended or adjusted under 35 U.S.C. 154(b) by 553 days.

(21) Appl. No.: 13/821,615

(22) PCT Filed: Sep. 8, 2011

(86) PCT No.: PCT/KR2011/006672
§ 371 (c)(1),
(2), (4) Date: May 28, 2013

(87) PCT Pub. No.: WO2012/033369
PCT Pub. Date: Mar. 15, 2012

(65) Prior Publication Data
US 2013/0252109 A1    Sep. 26, 2013

(30) Foreign Application Priority Data

Sep. 8, 2010 (KR) .................. 10-2010-0087726

(51) Int. Cl.
| | |
|---|---|
| H01M 4/525 | (2010.01) |
| C01G 53/10 | (2006.01) |
| C01G 53/00 | (2006.01) |
| H01M 4/62 | (2006.01) |
| H01M 4/1391 | (2010.01) |
| C01G 51/00 | (2006.01) |
| H01M 4/26 | (2006.01) |
| H01M 4/52 | (2010.01) |
| C01D 15/02 | (2006.01) |
| H01M 4/02 | (2006.01) |
| H01M 10/052 | (2010.01) |

(52) U.S. Cl.
CPC ............ *H01M 4/525* (2013.01); *C01G 53/10* (2013.01); *C01G 53/40* (2013.01); *H01M 4/625* (2013.01); *C01D 15/02* (2013.01); *C01G 51/40* (2013.01); *C01G 51/42* (2013.01); *C01P 2006/10* (2013.01); *C01P 2006/11* (2013.01); *C01P 2006/12* (2013.01); *C01P 2006/40* (2013.01); *H01M 4/1391* (2013.01); *H01M 4/26* (2013.01); *H01M 4/52* (2013.01); *H01M 10/052* (2013.01); *H01M 2004/028* (2013.01)

(58) Field of Classification Search
CPC ......... H01M 4/1391; H01M 4/26–4/54; C01D 15/02
See application file for complete search history.

(56) References Cited

U.S. PATENT DOCUMENTS

| | | |
|---|---|---|
| 6,193,946 B1 | 2/2001 | Kawano et al. |
| 6,352,794 B1 | 3/2002 | Nakanishi et al. |
| 7,341,805 B2 | 3/2008 | Ueda et al. |
| 7,700,009 B2 | 4/2010 | Miyazaki et al. |
| 9,023,524 B2 | 5/2015 | Imanari et al. |
| 2003/0087154 A1 | 5/2003 | Ohzuku et al. |
| 2006/0134521 A1 | 6/2006 | Shima |
| 2007/0087268 A1 | 4/2007 | Kim et al. |
| 2007/0141468 A1 | 6/2007 | Barker |
| 2007/0207383 A1 | 9/2007 | Ohzuku et al. |
| 2007/0231691 A1 | 10/2007 | Abe et al. |
| 2007/0231694 A1* | 10/2007 | Abe et al. .................. 429/231.1 |
| 2008/0063591 A1 | 3/2008 | Im et al. |
| 2009/0104517 A1 | 4/2009 | Yuasa et al. |
| 2009/0253039 A1* | 10/2009 | Kang et al. ................... 429/221 |
| 2010/0059706 A1 | 3/2010 | Dai et al. |
| 2010/0227221 A1 | 9/2010 | Chang et al. |
| 2011/0305939 A1 | 12/2011 | Imanari et al. |
| 2012/0321948 A1 | 12/2012 | Oya et al. |

FOREIGN PATENT DOCUMENTS

| | | | |
|---|---|---|---|
| CN | 1418174 A | | 5/2003 |
| CN | 101093888 A | | 12/2007 |
| CN | 101262061 A | * | 9/2008 |
| CN | 101510600 A | * | 8/2009 |
| EP | 2051319 A2 | | 4/2009 |
| EP | 2403043 A1 | | 1/2012 |
| JP | 1173966 A | | 3/1999 |
| JP | 2000195516 A | | 7/2000 |
| JP | 2001266876 A | | 9/2001 |
| JP | 200348718 A | | 2/2003 |
| JP | 2008210701 A | | 9/2008 |
| JP | 2009224097 A | | 10/2009 |
| JP | 2009224098 A | | 10/2009 |
| JP | 2009298679 A | * | 12/2009 |
| JP | 2009301813 A | | 12/2009 |
| KR | 20000068352 A | | 11/2000 |
| KR | 20030034018 A | | 5/2003 |
| KR | 1020080079588 A | | 9/2008 |
| KR | 1020090006898 A | | 1/2009 |

(Continued)

OTHER PUBLICATIONS

Machine transaltion of CN101510600A to Shen et al. originally published Aug. 2009.*

(Continued)

*Primary Examiner* — Milton I Cano
*Assistant Examiner* — Jennifer A Moss
(74) *Attorney, Agent, or Firm* — The Webb Law Firm

(57) ABSTRACT

Provided is a method for preparing a positive electrode active material for a lithium secondary battery, the method comprising: mixing and reacting a nickel source, a cobalt source, and an aluminum source, ammonia water, sucrose, and a pH adjusting agent to prepare a mixed solution; drying and oxidizing the mixed solution to prepare a positive electrode active material precursor; and adding a lithium source to the positive electrode active material precursor and firing them to prepare a positive electrode active material for a lithium secondary battery.

9 Claims, No Drawings

(56) References Cited

FOREIGN PATENT DOCUMENTS

| KR | 1020090020288 A | 2/2009 |
| KR | 1020100057235 A | 5/2010 |
| WO | 9829915 A1 | 7/1998 |
| WO | WO 2007094644 A1 * | 8/2007 |
| WO | 2010098187 A1 | 9/2010 |
| WO | 2011105126 A1 | 9/2011 |

OTHER PUBLICATIONS

Machine translation of Wu et al. CN 101262061 A, originally published Sep. 2008, obtained from Espacenet.com.*

Suresh et al., Synthesis and Characterization of Novel, High-Capacity, Layered LiMn0.9Ni0.05Fe0.05O2 as a Cathode Material for Li-Ion Cells, Electrochemical and Solid-State Letters, (205), p. A263-A266, 8(6).

* cited by examiner

POSITIVE ELECTRODE ACTIVE MATERIAL FOR LITHIUM SECONDARY BATTERY AND METHOD FOR PREPARING THE SAME

TECHNICAL FIELD

The present invention relates to a positive electrode active material for a lithium secondary battery and a method for preparing the same, and more particularly, to a positive electrode active material having significantly high capacity and improved electro-chemical properties, and a method for preparing the same.

BACKGROUND ART

A battery is mainly divided into a primary battery and a secondary battery. Here, the primary battery may not be reused after once being used since it uses an irreversible reaction to generate electricity, for example, a dry cell, a mercury battery, a Volta battery, or the like, that are generally used. On the contrary, the secondary battery may be reused by being charged after being used since it uses a reversible reaction, for example, a lead acid battery, a lithium ion battery, a Ni—Cd battery, or the like.

A lithium ion battery, which is one of the secondary batteries, is configured to include a negative electrode generally made of carbon, a positive electrode generally made of a lithium compound, an electrolyte positioned between the two electrodes, and an electric wire connecting the negative electrode and positive electrode to each other. Lithium ions in the electrolyte move to the negative electrode at the time of charging and move to the positive electrode at the time of discharging, and excess electrons are discharged or absorbed in each electrode, thereby causing a chemical reaction. The electron flows in the electric wire in this process, and as a result, electric energy is generated. Although the case of the lithium ion battery is described by way of example here, in the case of other secondary batteries, the basic principle and structure are the same as those of the lithium ion battery except that materials used as the electrode or the electrolyte are changed. That is, in general, the secondary battery is configured to include the negative electrode, the positive electrode, the electrolyte, and the electric wire as described above.

In this case, the secondary battery may be configured to include one negative electrode, one positive electrode, one electrode, and one electric wire, but more generally, may be formed by connecting a plurality of unit cells configured of one negative electrode, one positive electrode, one electrode, and one electric wire to each other. That is, the plurality of unit cells as described above are filled in the secondary battery pack. The unit cells are electrically connected to each other, respectively.

Generally, the secondary battery includes the plurality of unit cells and has a shape in which a pair of external terminal taps connected to electrodes of each of the cells (that is, a tap configured of a pair of a negative electrode connected to the negative electrode of each of the unit cells and a positive electrode connected to the positive electrode of each of the unit cells per one battery to serve as an electrode) is exposed to the outside. In the secondary batteries as described above, generally, a plurality of positive electrodes and negative electrodes are connected to each other to form a battery as a single pack rather than using a single positive electrode and a single negative electrode.

As a positive electrode active material for a lithium secondary battery, a lithium active material precursor such as Li-M-P based (M is at least one selected from a group consisting of Fe, Mn, Co, and Ni), Li—Mn—Ni based, Li—Ni—Mn—Co based materials has been used as disclosed in Korean Patent Laid-Open Publication Nos. 2009-0020288 and 2009-0006898.

However, a $LiNi_{1/3}Co_{1/3}Mn_{1/3}O_2$ material widely used as the positive electrode active material for a lithium secondary battery has a capacity of about 150 mAh/g at the time of testing the capacity using a half cell in the case in which a cut-off voltage is 3.0 to 4.3V. Therefore, in order to manufacture a high capacity battery such as a battery for an electric vehicle (EV), the development of a high capacity positive electrode active material has been urgently demanded.

DISCLOSURE

Technical Problem

An object of the present invention is to provide a positive electrode active material for a high capacity lithium secondary battery, and a method for preparing the same. Another object of the present invention is to provide a positive electrode active material for a lithium secondary battery in which lithium ions may be smoothly separated from and inserted into a structure of the positive electrode active material for a lithium secondary battery according to the present invention, such that electro-chemical properties may be improved in accordance with the increase in a diffusion rate of the lithium ion, and a high rate capability may be improved, and a method for preparing the same.

Technical Solution

In one general aspect, a method for preparing a positive electrode active material according to the present invention is a method for preparing a positive electrode active material for a lithium secondary battery capable of having a high specific surface area, a high pore volume, and a high capacity by having a porous structure. The method for preparing a porous positive electrode active material includes: mixing and reacting raw materials including a metal aqueous solution containing a nickel source, a cobalt source, and an aluminum source, ammonia water, sucrose, and a pH adjusting agent to prepare a positive electrode active material precursor; and adding a lithium source to the positive electrode active material precursor and firing them to prepare a positive electrode active material for a lithium secondary battery represented by the following Chemical Formula 1.

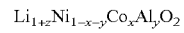   [Chemical Formula 1]

$Li_{1+z}Ni_{1-x-y}Co_xAl_yO_2$ z, x, y, and 1−x−y are real numbers that satisfy the following Equations, respectively: 0≤z≤0.3, 0.05≤x≤0.3, 0<y≤0.3, and 0.4≤1−x−y<0.95. Preferably, y and 1−x−y are real numbers that satisfy the following Equations, respectively: 0.01≤y≤0.3 and 0.4≤1−−y≤0.94.

As described above, the method according to the present invention is characterized in that after the positive electrode active material precursor is prepared using the nickel source, the cobalt source, the aluminum source, ammonia water, which is a chelating agent, the pH adjusting agent, and sucrose as the raw materials, the lithium source is added to the positive electrode active material precursor and heat-treated, thereby preparing the positive electrode active material.

The positive electrode active material for a lithium secondary battery prepared according to the present invention may have a total pore volume of $6.5 \times 10^{-2}$ to $8.0 \times 10^{-2}$ cc/g and a specific surface area of 0.7 to 1.0 m$^2$/g and be a spherical particle having a porous structure.

In the positive electrode active material for a lithium secondary battery prepared according to the present invention, high rate capability is significantly improved, such that in the case in which a half cell test is performed, the positive electrode active material may exhibit a high capacity of 200 mAh/g or more, more specifically, a capacity of 200 to 215 mAh/g.

In detail, in the method for preparing a positive electrode active material according to the present invention, a metal aqueous solution containing the nickel source, the cobalt source, and the aluminum source, preferably, a metal aqueous solution containing the nickel source, the cobalt source, the aluminum source, and sucrose and the ammonia water are input and reacted with each other in a reactor to prepare a reactant while constantly maintaining pH of the mixed solution supplied to the reactor using the pH adjusting agent, and the prepared reactant was dried and naturally oxidized to prepare the positive electrode active material precursor, followed by mixing the prepared active material precursor and the lithium source and firing them, thereby making it possible to prepare the positive electrode active material for a lithium secondary battery of Chemical Formula 1.

As the nickel source, one or two or more selected from nickel sulfate, nickel nitrate, nickel carbonate, nickel acetate, nickel chloride, and nickel hydroxide may be used, and nickel sulfate may be preferable.

As the cobalt source, one or two or more selected from cobalt sulfate, cobalt nitrate, cobalt carbonate, cobalt chloride, and cobalt hydroxide may be used, and cobalt sulfate may be preferable.

As the aluminum source, one or two or more selected from $Al_2O_3$, $Al(ClO_4)_3$, $AlPO_4$, $AlK(SO_4)_2$, $Al_2(SO_4)_3$, $Al_2S_3$, $Al_2O_3$, $TiO_2$, $AlF_3$, and a hydrate thereof may be used, and aluminum sulfate may be preferable.

The nickel source, the cobalt source, and the aluminum source are supplied into the reactor in an aqueous solution state, and in the metal aqueous solution containing the nickel source, the cobalt source, and the aluminum source, the metal has a mole concentration of 1 to 3M. In this case, the metal means nickel, cobalt, and aluminum.

In the case in which the mole concentration is less than 1M, a reaction time for forming a spherical particle may be increased, and in the case in which the mole concentration is more than 3M, reactivity at an initial stage of the reaction is increased, such that tap density may be decreased.

It may be preferable in view of reactivity that the metal aqueous solution is supplied into the reactor at a rate of 0.2 to 0.5 L/hr.

The nickel source, the cobalt source, and the aluminum source that are contained in the metal aqueous solution may be input at a content determined so as to satisfy element ratios of nickel, cobalt, and aluminum according to Chemical Formula 1.

More specifically, nickel, cobalt, and aluminum may be contained in the metal aqueous solution at a molar ratio of 0.4 to 0.94:0.05 to 0.3:0.01 to 0.3. More specifically, based on the mole of each metal element in the nickel source, the cobalt source, and the aluminum source, the cobalt source is contained so that a mole number ratio of cobalt to the total mole number of the metal elements (nickel, cobalt, and aluminum) is 0.05 to 0.3, the aluminum source is contained so that a mole number ratio of aluminum to the total mole number of the metal elements is over 0 to 0.3, preferably 0.01 to 0.3, and the nickel source is contained so that a mole number ratio of nickel to the total mole number of metal elements is 0.4 to under 0.95, preferable 0.4 to 0.94.

In the case in which the molar ratios of Co and Al are over the ranges limited as described above, that is, in the case in which the content of Co is less than 0.05 mole, the content of Ni may become excessive, such that stability may be deteriorated, and in the case in which the content is more than 0.3 mole, the capacity of the entire positive electrode active material may be decreased. Further, in the case in which the content of Al is less than 0.01, structural stability may not be exhibited, and in the case in which the content of Al is more than 0.2, a decrease in the capacity may be generated.

The sucrose may be contained in the metal aqueous solution at a content of 5 to 30 weight %. The sucrose is present in Ni—Co—Al—(OH)$_2$ by a mixing reaction of the raw materials and carbonized at the time of firing, thereby forming pores in the particles of the prepared positive electrode active material for a lithium secondary battery. Since the electrolyte solution may be infiltrated into the particle due to the pore, lithium ions may be smoothly separated from and inserted into the structure, such that the high rate capability may be improved.

The metal aqueous solution containing the sucrose as described above, ammonia water, and the pH adjusting agent are input and stirred to prepare the positive electrode active material precursor. In this case, pH of the mixed solution in the reactor is adjusted by the pH adjusting agent so as to be 11 to 13, and a supply rate of the raw materials may be adjusted so that an average residence time of the mixed solution in the reactor is 5 to 7 hours. A reaction temperature in the reactor may be 40 to 60° C. The pH adjusting agent for adjusting the pH is not particularly limited, but sodium hydroxide may be preferably used.

A concentration of the ammonia water may be preferably 0.1 to 0.25 times the mole concentration of the metal in the metal aqueous solution, and the ammonia water may be supplied and mixed into the reactor at a rate of 0.02 to 0.05 L/hr. Ammonia, which is a chelating agent, may be used to chelate metal-ions with a uniform composition. In the case in which the concentration of ammonia is out of the above-mentioned range, the mixed solution is precipitated by NaOH with a non-uniform composition, such that the optimum precursor may not be obtained.

The positive electrode active material precursor may be prepared by drying and naturally oxidizing the reactant obtained in the reactor. Although not particularly limited thereto, it may be preferable that the obtained reactant is dried at 90 to 120° C. for 10 to 20 hours and naturally oxidized at the same temperature for 10 to 15 hours in the air.

The positive electrode active material may be prepared by adding the lithium source to the positive electrode active material precursor and firing them.

In detail, the positive electrode active material precursor obtained by drying and natural oxidation and the lithium source are mixed with each other using a general mixing device such as a mixer, and then a mixture of the positive electrode active material precursor and the lithium source is heat-treated, thereby preparing the positive electrode active material according to the present invention.

At the time of mixing the positive electrode active material precursor and the lithium source, the lithium source may be input at a content determined so as to satisfy the element ratio of lithium according to Chemical Formula 1.

In detail, when the sum of the mole numbers of nickel in the nickel source, cobalt in the cobalt source, and aluminum in the aluminum source that are contained in the mixed solution for preparing the positive electrode active material precursor is defined as the total metal mole number, the lithium source corresponding to 1 to 1.3 moles of lithium based on 1 mole of the total metal mole number may be preferably mixed with the positive electrode active material precursor.

The lithium source may include a lithium salt, wherein the lithium salt includes LiOH.

At the time of firing, the firing process may include a first step of raising a temperature to 400~500° C. at a rate of 0.5 to 1° C./min; and a second step of raising a temperature to 800~900° C. at a rate of 1 to 2° C./min, and a firing time may be 15 to 20 hours based on a time point at which the temperature is raised in the first step.

More specifically, the firing may be preferably heat-treatment in multi-steps performed by raising the temperature to 400~500° C. at the rate of 0.5 to 1° C./min to perform heat-treatment at 400~500° C., and raising the temperature to 800~900° C. at a rate of 1 to 2° C./min to again perform heat-treatment at 800~900° C. In this case, the heat-treatment at 400~500° C. may be performed for 4 to 6 hours.

In the case in which the rate of raising the temperature is out of the above-mentioned range, sucrose may be rapidly decomposed, such that the prepared positive electrode active material particles for a lithium secondary battery may be broken. Therefore, in order to more effectively form the pore, the firing needs to be performed so as to satisfy the above-mentioned conditions (heat-treatment profile).

The positive electrode active material for a lithium secondary battery prepared according to the present invention may be porous particles having a uniform size of 5 to 15 μm and have a structure of Chemical Formula 1 and pores formed therein.

$$Li_{1+z}Ni_{1-x-y}Co_xAl_yO_2 \qquad \text{[Chemical Formula 1]}$$

x, y, and 1−x−y are real numbers that satisfy the following Equations, respectively: $0 \leq z \leq 0.3$, $0.05 \leq x \leq 0.3$, $0 < t \leq 0.3$, and $0.4 \leq 1-x-y < 0.95$. Preferably, y and 1−x−y are real numbers that satisfy the following Equations, respectively: $0.01 \leq y \leq 0.3$ and $0.4 \leq 1-x-y \leq 0.94$.

Advantageous Effects

In a method for preparing a positive electrode active material for a lithium secondary battery according to the present invention, since pores are formed in particles of the prepared positive electrode active material for a lithium secondary battery by adding sucrose, an electrolyte solution may be infiltrated into the particle due to the pore, such that lithium ions may be smoothly separated from and inserted into a structure of the positive electrode active material, thereby improving high rate capability. In addition, since a pore volume of the positive electrode active material for a lithium secondary battery according to the present invention is wide, a diffusion rate of the lithium ion in the structure of the prepared positive electrode active material may be increased, thereby improving electro-chemical properties.

BEST MODE

Hereinafter, the present invention will be described in detail through the Examples. However, these Examples are only to illustrate the present invention, and those skilled in the art will appreciate that these Examples are not to be construed as limiting a scope of the present invention.

EXAMPLE 1

In a 4 L reactor, a metal aqueous solution in which nickel sulfate (NiSO$_3$6H$_2$O), cobalt sulfate (CoSO$_4$7H$_2$O), and aluminum sulfate (Al$_2$(SO$_4$)$_3$18H$_2$O) were dissolved at a concentration of 2M and 20 weight % of sucrose is contained was supplied at a rate of 0.3 L/hr. In this case, the metal aqueous solution contained nickel sulfate (NiSO$_3$6H$_2$O), cobalt sulfate (CoSO$_4$7H$_2$O), and aluminum sulfate (Al$_2$(SO$_4$)$_3$18H$_2$O) so that nickel, cobalt, and aluminum had a molar ratio of 0.7:0.1:0.2.

0.2M ammonia water was supplied into the reactor at a rate of 0.03 L/hr, and sodium hydroxide was added thereto so as to have pH of 11, followed by reaction with stirring the reactor, thereby preparing a mixed solution. At this time, an average temperature was maintained at 40° C. at the time of the reaction.

A rotary blade of the reactor was designed as two reverse rotational rotary blades for vertically uniform mixing, and an output of a rotation motor was 2.4 kw. The number of revolutions was 1500 rpm.

The reactant obtained from the reactor was dried at 110° C. for 15 hours and then naturally oxidized for 12 hours in the air to prepare a positive electrode active material precursor.

After the prepared active material precursor and lithium hydroxide (LiOH) were mixed at a molar ratio of 1:1.05, a temperature was raised to 500° C. at a rate of 1° C./min to perform heat-treatment for 5 hours, and then the temperature was raised again to 900° C. at a rate of 2° C./min to perform the firing so that the total firing time became 20 hours, thereby preparing a positive electrode active material for a lithium secondary battery, Li$_{1.05}$Ni$_{0.7}$Co$_{0.1}$Al$_{0.2}$O$_2$. In the prepared positive electrode active material for a lithium secondary battery, uniform particles having an average diameter of 10 μm and pores formed therein was obtained.

EXAMPLE 2

A positive electrode active material for a lithium secondary battery, Li$_{1.05}$Ni$_{0.6}$Co$_{0.1}$Al$_{0.3}$O$_2$, was prepared by the same method as in Example 1 except that the metal aqueous solution contained nickel sulfate (NiSO$_3$6H$_2$O), cobalt sulfate (CoSO$_4$7H$_2$O), and aluminum sulfate (Al$_2$(SO$_4$)$_3$18H$_2$O) so that nickel, cobalt, and aluminum had a molar ratio of 0.6:0.1:0.3.

COMPARATIVE EXAMPLE 1

A positive electrode active material for a lithium secondary battery was prepared by the same method as in Example 1 except that sucrose was not contained.

Specific surface areas and average pore volumes of the particles prepared in Example 1 and Comparative Example 1 were measured, and the results were shown in Table 1.

TABLE 1

|  | Specific surface area (m²/g) | Pore volume (cc/g) |
|---|---|---|
| Example 1 | 0.8 | 7.130 × 10⁻² |
| Comparative Example 1 | 0.6 | 5.830 × 10⁻³ |

As shown in Table 1, it may be appreciated that in the case of the positive electrode active material according to the present invention, the porous particle having a significantly large pore volume was prepared, and the specific surface area was significantly large.

Capacities of the particles prepared in Examples 1 and 2 and Comparative Example 1 were measured, and the results were shown in Table 2.

TABLE 2

|  | Capacity (mAh/g) |
|---|---|
| Example 1 | 215 |
| Example 1 | 205 |
| Comparative Example 1 | 200 |

The invention claimed is:

1. A method for preparing a porous positive electrode active material for a lithium secondary battery, the method comprising:

mixing and reacting raw materials including a metal aqueous solution containing a nickel source, a cobalt source, and an aluminum source, ammonia water, sucrose as a pore forming agent, and a pH adjusting agent to prepare a positive electrode active material precursor wherein the sucrose is present in the positive electrode active material precursor;

drying and naturally oxidizing the positive electrode active material precursor to prepare a solid positive electrode active material precursor;

mixing a lithium salt in a solid form with the solid positive electrode active material precursor to prepare a solid mixture; and firing the solid mixture in air to prepare a positive electrode active material for a lithium secondary battery represented by the following Chemical Formula 1

$$Li_{1+z}Ni_{1-x-y}Co_xAl_yO_2$$ [Chemical Formula 1]

(z, x, y, and 1−x−y are real numbers that satisfy the following Equations, respectively: 0≤z≤0.3, 0.05≤x≤0.3, and 0.4≤1−x−y<0.95), wherein a content of the sucrose contained in the metal aqueous solution is 5 to 30 weight %, wherein in firing, the sucrose which is present in the solid positive electrode active material precursor is carbonized and pores are formed in the positive electrode active material, and wherein the positive electrode active material has a total pore volume of $6.5 \times 10^{-2}$ to $8.0 \times 10^{-2}$ cc/g and a specific surface area of 0.7 to 1.0 m$^2$/g.

2. The method of claim 1, wherein the firing is performed for 15 to 20 hours through a first step of raising a temperature to 400~500° C. at a rate of 0.5 to 1° C./min; and a second step of raising a temperature to 800~900° C. at a rate of 1 to 2° C./min.

3. The method of claim 1, wherein a concentration of the metal in the metal aqueous solution is 1 to 3M.

4. The method of claim 3, wherein a molar ratio of nickel, cobalt, and aluminum contained in the metal aqueous solution is 0.5 to 0.94:0.05 to 0.3: 0.01 to 0.3.

5. The method of claim 3, wherein the metal aqueous solution is supplied into a reactor at a rate of 0.2 to 0.5 L/hr.

6. The method of claim 1, wherein pH of the mixture at the time of conducting the mixing reaction is 11 to 13.

7. The method of claim 1, wherein a concentration of the ammonia water is 0.1 to 0.25 times a mole concentration of the metal in the metal aqueous solution.

8. The method of claim 7, wherein the ammonia water is supplied at a rate of 0.02 to 0.05 L/hr.

9. The method of claim 1, wherein the lithium salt is LiOH.

* * * * *